US012777495B2

(12) United States Patent
Matsumura et al.

(10) Patent No.: US 12,777,495 B2
(45) Date of Patent: Oct. 27, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 586 days.

(21) Appl. No.: 17/923,402

(22) PCT Filed: May 7, 2020

(86) PCT No.: PCT/JP2020/018565
§ 371 (c)(1),
(2) Date: Nov. 4, 2022

(87) PCT Pub. No.: WO2021/224967
PCT Pub. Date: Nov. 11, 2021

(65) Prior Publication Data

US 2023/0199794 A1 Jun. 22, 2023

(51) Int. Cl.
*H04W 72/231* (2023.01)
*H04W 72/044* (2023.01)

(52) U.S. Cl.
CPC ....... *H04W 72/231* (2023.01); *H04W 72/046* (2013.01)

(58) Field of Classification Search
CPC .......................... H04W 72/231; H04W 72/046
USPC .......................................................... 370/329
See application file for complete search history.

(56) References Cited

U.S. PATENT DOCUMENTS

| | | | | |
|---|---|---|---|---|
| 12,108,426 B2 * | 10/2024 | Kim | H04W 72/046 | |
| 2020/0053757 A1 * | 2/2020 | Bagheri | H04L 5/10 | |
| 2021/0112610 A1 * | 4/2021 | Xiao | H04L 1/1614 | |
| 2022/0046541 A1 * | 2/2022 | Wu | H04W 72/542 | |
| 2022/0294514 A1 * | 9/2022 | Kang | H04B 7/06964 | |
| 2023/0155783 A1 * | 5/2023 | Liu | H04B 7/0695 | 370/329 |

FOREIGN PATENT DOCUMENTS

| | | |
|---|---|---|
| EP | 3667943 A1 | 6/2020 |
| WO | 2019/244218 A1 | 12/2019 |

OTHER PUBLICATIONS

Decision of Refusal issued in Japanese Application No. 2022-519862, dated Jun. 11, 2024 (4 pages).
Office Action issued in Chinese Application No. 202080102497.1, dated Jun. 13, 2024 (14 pages).

(Continued)

*Primary Examiner* — Chi Tang P Cheng
(74) *Attorney, Agent, or Firm* — Osha Bergman Watanabe & Burton LLP

(57) ABSTRACT

A terminal according to one aspect of the present disclosure includes a receiving section that receives a MAC control element (MAC CE) capable of specifying a plurality of transmission configuration indication (TCI) states for one control resource set, and a control section that controls reception of downlink control information transmitted from each of a plurality of transmission points by using a same control resource set, based on the MAC CE.

7 Claims, 11 Drawing Sheets

(56) References Cited

OTHER PUBLICATIONS

International Search Report issued in PCT/JP2020/018565 on Dec. 8, 2020 (2 pages).
Written Opinion of the International Searching Authority issued in PCT/JP2020/018565 on Dec. 8, 2020 (4 pages).
Samsung; "Reduction of signaling and latency for beam managements"; 3GPP TSG-RAN WG2 Meeting #108, R2-1915248; Reno, US; Nov. 18-22, 2019 (8 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Office Action issued in Japanese Application No. 2022-519862; Dated Feb. 6, 2024 (6 pages).
Office Action issued in Chinese Patent Application No. 202080102497.1, dated Jan. 23, 2025 (11 Pages).

* cited by examiner

| DISTANCE BETWEEN TWO TRPs | TIME REQUIRED BETWEEN TWO TRPs | TIME REQUIRED BETWEEN TWO BEAMS |
| --- | --- | --- |
| 200m | 1.44s | 22.5ms |
| 300m | 2.16s | 33.75ms |

FIG. 2

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G)," "5G+ (plus)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (for example, NR), in order to implement radio communication in a moving object (for example, a train or the like) that moves at a high speed, using beams transmitted from transmission points (for example, Remote Radio Heads (RRHs)) installed in a path of the moving object is assumed.

However, how to control radio communication in the moving object using the beams transmitted from each transmission point has not yet been fully studied.

In view of this, the present disclosure has one object to provide a terminal, a radio communication method, and a base station that enable appropriate control of radio communication even when a moving object is used.

Solution to Problem

A terminal according to one aspect of the present disclosure includes a receiving section that receives a MAC control element (MAC CE) capable of specifying a plurality of transmission configuration indication (TCI) states for one control resource set, and a control section that controls reception of downlink control information transmitted from each of a plurality of transmission points by using a same control resource set, based on the MAC CE.

Advantageous Effects of Invention

According to one aspect of the present disclosure, radio communication can be appropriately controlled even when a moving object is used.

BRIEF DESCRIPTION OF DRAWINGS

FIG. 2 is a diagram to show an example of a timescale between TRPs;

Figure 1A:
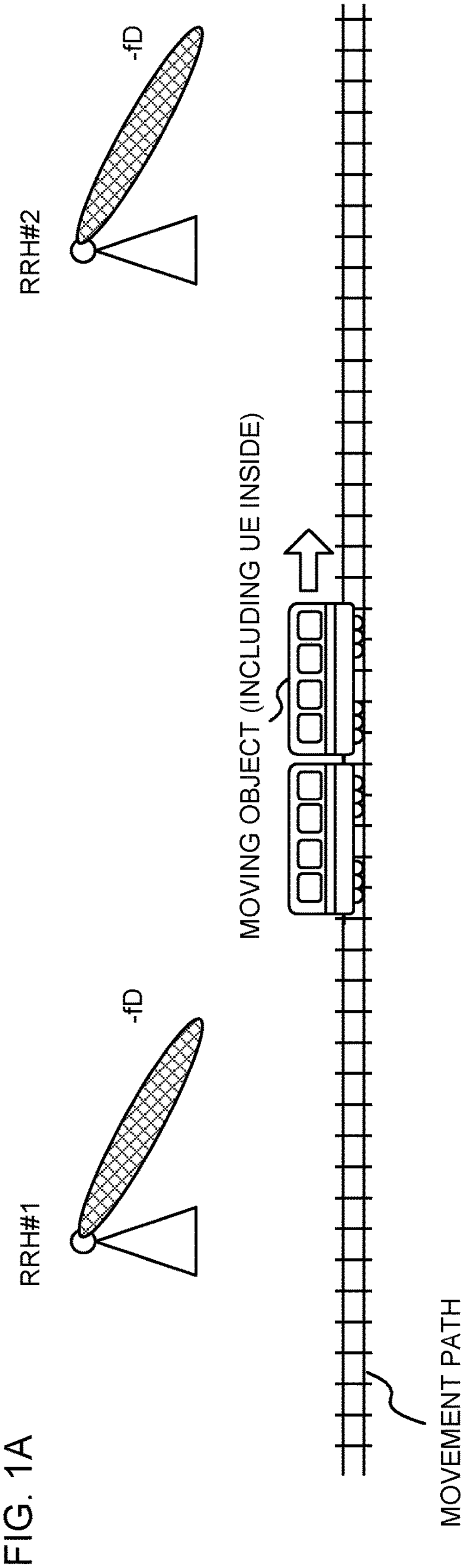
FIG. 1A and FIG. 1B are each a diagram to show an example of communication between a moving object and transmission points.

DESCRIPTION OF EMBODIMENTS (TCI, Spatial Relation, QCL)

For NR, control of reception processing (for example, at least one of reception, demapping, demodulation, and decoding) and transmission processing (for example, at least one of transmission, mapping, precoding, modulation, and coding) in a UE regarding at least one of a signal and a channel (which may be referred to as a signal/channel) based on a transmission configuration indication state (TCI state) has been under study.

The TCI state may be a state applied to a downlink signal/channel. A state that corresponds to the TCI state applied to an uplink signal/channel may be expressed as spatial relation.

The TCI state is information related to quasi-co-location (QCL) of the signal/channel, and may be referred to as a spatial reception parameter, spatial relation information, or the like. The TCI state may be configured for the UE for each channel or for each signal.

QCL is an indicator indicating statistical properties of the signal/channel. For example, when a certain signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have different parameter(s) (or parameter set(s)) that can be assumed to be the same, and such parameter(s) (which may be referred to as QCL parameter (s)) are described below:

QCL type A (QCL-A): Doppler shift, Doppler spread, average delay, and delay spread QCL type B (QCL-B): Doppler shift and Doppler spread QCL type C (QCL-C): Doppler shift and average delay QCL type D (QCL-D): Spatial reception parameter A case that the UE assumes that a certain control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel, based on the TCI state or the QCL assumption of the signal/channel.

The TCI state may be, for example, information related to QCL between a channel as a target (that is, a reference signal (RS) for the channel) and another signal (for example, another RS). The TCI state may be configured (indicated) by higher layer signaling or physical layer signaling, or a combination of these.

In the present disclosure, the higher layer signaling may be, for example, any one of Radio Resource Control (RRC) signaling, Medium Access Control (MAC) signaling, broadcast information, and the like, or a combination of these.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

The physical layer signaling may be, for example, downlink control information (DCI).

A channel for which the TCI state or spatial relation is configured (indicated) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS to have a QCL relationship with the channel may be, for example, at least one of a synchronization signal block (SSB), a channel state information reference signal (CSI-RS), a reference signal for measurement (Sounding Reference Signal (SRS)), a CSI-RS for tracking (also referred to as a Tracking Reference Signal (TRS)), and a reference signal for QCL detection (also referred to as QRS).

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

An information element of the TCI state ("TCI-state IE" of RRC) configured using higher layer signaling may include one or a plurality of pieces of QCL information ("QCL-Info"). The QCL information may include at least one of information related to the RS to have a QCL relationship (RS relation information) and information indicating a QCL type (QCL type information). The RS relation information may include information such as an index of the RS (for example, an SSB index, or a non-zero power CSI-RS (NZP CSI-RS) resource ID (Identifier)), an index of a cell in which the RS is located, and an index of a Bandwidth Part (BWP) in which the RS is located.

In Rel. 15 NR, as the TCI state of at least one of the PDCCH and the PDSCH, both of the RS of QCL type A and the RS of QCL type D, or only the RS of QCL type A may be configured for the UE.

In a case where the TRS is configured as the RS for the QCL type A, unlike a demodulation reference signal (DMRS) for the PDCCH or the PDSCH, the TRS is expected to be transmitted such that the same TRS is periodically transmitted for an extended period of time. The UE can measure the TRS and calculate the average delay, the delay spread, and the like.

In a case where, for the UE, the TRS is configured as the RS for the QCL type A, in the TCI state of the DMRS for the PDCCH or the PDSCH, the UE can assume that the DMRS for the PDCCH or the PDSCH is the same as the QCL type A parameters (average delay, delay spread, and the like) for the TRS. Thus, the type A parameters (average delay, delay spread, and the like) for the DMRS for the PDCCH or the PDSCH can be determined from measurement results for the TRS. When performing channel estimation for at least one of the PDCCH and the PDSCH, the UE can use the measurement results for the TRS to perform more accurate channel estimation.

In a case where the RS for the QCL type D is configured for the UE, the UE can use the RS for the QCL type D to determine the UE receive beam (spatial domain filter, and UE spatial domain reception filter).

The RS for QCL type X for the TCI state may mean the RS in the QCL type X relation with (the DMRS for) a certain channel/signal, and the RS may be referred to as a QCL source of the QCL type X for the TCI state.

<TCI State for PDCCH>

Information related to the QCL between the PDCCH (or a DMRS antenna port related to the PDCCH) and a certain RS may be referred to as a TCI state for the PDCCH or the like.

The UE may determine the TCI state for a UE-specific PDCCH (or CORESET), based on higher layer signaling. For example, one or a plurality (K) of TCI states may be configured for the UE for each CORESET by using RRC signaling.

For the UE, for each CORESET, one of the plurality of TCI states configured by using RRC signaling may be activated by using the MAC CE. The MAC CE may be referred to as a TCI state indication MAC CE for a UE-specific PDCCH (TCI State Indication for UE-specific PDCCH MAC CE). The UE may perform monitoring of the CORESET, based on an active TCI state corresponding to the CORESET.

<TCI State for PDSCH>

Information related to the QCL between the PDSCH (or a DMRS antenna port related to the PDSCH) and a certain DL-RS may be referred to as a TCI state for the PDSCH or the like.

M (M≥1) TCI states for the PDSCH (M pieces of QCL information for the PDSCH) may be indicated (configured) for the UE by using higher layer signaling. Note that the number M of TCI states configured for the UE may be restricted by at least one of UE capability and the QCL type.

The DCI used for scheduling of the PDSCH may include a certain field (which may be referred to as, for example, a TCI field, a TCI state field, or the like) indicating the TCI state for the PDSCH. The DCI may be used for scheduling of the PDSCH of one cell, and may be referred to as, for example, DL DCI, DL assignment, DCI format 1_0, DCI format 1_1, or the like.

Whether or not the TCI field is included in the DCI may be controlled with information indicated from the base station to the UE. The information may be information (for example, TCI presence information, TCI presence information in DCI, higher layer parameter TCI-PresentInDCI) indicating whether the TCI field is present or absent in the DCI. The information may be, for example, configured for the UE using higher layer signaling.

When more than eight types of TCI states are configured for the UE, eight or less types of TCI states may be activated (or specified), using the MAC CE. The MAC CE may be referred to as a TCI state activation/deactivation MAC CE for a UE-specific PDSCH (TCI States Activation/Deactivation for UE-specific PDSCH MAC CE). The value of the TCI field in the DCI may indicate one of the TCI states activated using the MAC CE.

When the TCI presence information set as "enabled" is configured for the UE for the CORESET for scheduling the PDSCH (CORESET used for PDCCH transmission for scheduling the PDSCH), the UE may assume that the TCI field is present in DCI format 1_1 of the PDCCH transmitted on the CORESET.

In a case in which the TCI presence information is not configured for the CORESET for scheduling the PDSCH, or the PDSCH is scheduled by DCI format 1_0, when a time offset between reception of the DL DCI (DCI for scheduling the PDSCH) and reception of the PDSCH corresponding to the DCI is equal to or larger than a threshold, in order to determine the QCL of a PDSCH antenna port, the UE may assume that the TCI state or the QCL assumption for the PDSCH is the same as the TCI state or the QCL assumption applied to the CORESET used for PDCCH transmission for scheduling the PDSCH.

In a case in which the TCI presence information is set as "enabled", when the TCI field in the DCI in a component carrier (CC) for scheduling (the PDSCH) indicates an activated TCI state in the scheduled CC or the DL BWP, and the PDSCH is scheduled by DCI format 1_1, in order to determine the QCL of the PDSCH antenna port, the UE may use the TCI in accordance with the value of the TCI field in the detected PDCCH having the DCI. When the time offset between reception of the DL DCI (for scheduling the PDSCH) and the PDSCH corresponding to the DCI (PDSCH scheduled by the DCI) is equal to or larger than the threshold, the UE may assume that the DM-RS port of the PDSCH of the serving cell is quasi co-located with the RS in the TCI state related to a QCL type parameter given by the indicated TCI state.

In both of the case in which the TCI information in DCI (higher layer parameter TCI-PresentInDCI) is set to "enabled" and the case in which the TCI information in DCI is not configured in an RRC connection mode, when the time offset between reception of the DL DCI (DCI for scheduling the PDSCH) and its corresponding PDSCH (PDSCH scheduled by the DCI) is less than the threshold, the UE may assume that the DM-RS port of the PDSCH of the serving cell has the minimum (lowest) CORESET-ID in the latest (most recent) slot in which one or more CORESETs in the active BWP of the serving cell are monitored by the UE, and is quasi co-located with the RS related to the QCL parameter used for QCL indication of the PDCCH of the CORESET associated with the monitored search space. The RS may be referred to as a default TCI state of the PDSCH or a default QCL assumption of the PDSCH.

The time offset between the reception of the DL DCI and the reception of the PDSCH corresponding to the DCI may be referred to as a scheduling offset.

The threshold may be referred to as time duration for QCL, a "timeDurationForQCL", a "Threshold", a "Threshold for offset between a DCI indicating a TCI state and a PDSCH scheduled by the DCI", a "Threshold-Sched-Offset", a schedule offset threshold, a scheduling offset threshold, or the like.

The time duration for QCL may be based on the UE capability, and may be, for example, based on a delay that is required for decoding of the PDCCH and beam switch. The time duration for QCL may be a minimum period of time that is required for the UE to perform PDCCH reception and application of spatial QCL information received in the DCI for PDSCH processing. The time duration for QCL may be represented by the number of symbols for each subcarrier spacing, or may be represented by time (for example, has). Information of the time duration for QCL may be indicated from the UE to the base station as UE capability information, or may be configured from the base station to the UE by using higher layer signaling.

For example, the UE may assume that the DMRS port of the PDSCH is quasi co-located with the DL-RS that is based on the TCI state activated for the CORESET corresponding to the minimum CORESET-ID. The latest slot may be, for example, a slot in which the DCI for scheduling the PDSCH is received.

Note that the CORESET-ID may be an ID configured by using the RRC information element "ControlResourceSet" (ID for identification of the CORESET, controlResourceSetId).

When the CORESET is not configured for a CC, the default TCI state may be an activated TCI state having the lowest ID that can be applied to the PDSCH in the active DL BWP of the CC.

(HST)

In NR, in order to perform communication with a terminal (hereinafter also referred to as a UE) included in a moving object (HST (high speed train) that moves at a high speed, such as a train, using beams transmitted from transmission points (for example, RRHs) is assumed (see FIG. 1A and FIG. 1B).

FIG. 1A shows a case in which communication with the moving object is performed by transmitting a uni-directional beam from the RRHs. FIG. 1A shows a case in which RRHs are installed along a movement path (or a moving direction, a traveling direction, traveling path) of the moving object, and a beam is formed from each RRH toward the traveling direction of the moving object. The RRH that forms the uni-directional beam may be referred to as a uni-directional RRH.

Note that, here, a case in which a beam is formed toward the traveling direction of the moving object is shown. However, this is not restrictive, and a beam may be formed toward a direction opposite to the traveling direction, or a beam may be formed in every direction regardless of the traveling direction of the moving object.

Figure 1B:
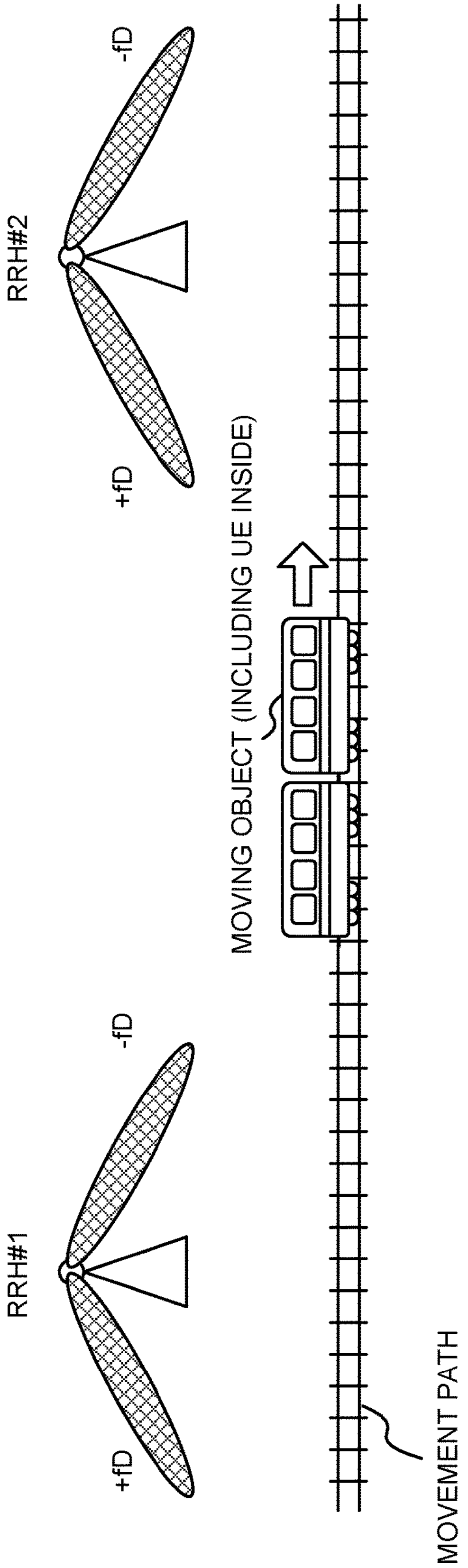

FIG. 1B shows a case in which communication with the moving object is performed by transmitting a plurality (for example, two or more) of beams from the RRHs. For example, it is assumed that the beams are formed in both of the traveling direction of the moving object and the direction opposite to the traveling direction.

FIG. 1B shows a case in which the RRHs are installed along the movement path of the moving object, and beams are formed from each RRH toward both of the traveling direction of the moving object and the direction opposite to the traveling direction. The RRH that forms the beams of the plurality of directions (for example, two directions) may be referred to as a bi-directional RRH.

In future, it is desirable that communication in the moving object that moves at the speed of 500 km/h or higher be supported by using a plurality of RRHs installed in the movement path (without assist of a macro cell).

For example, a distance between two TRPs (or RRHs/antennas) and time necessary between two beams are studied. Here, as an example, the following case is assumed: the speed of the moving object is 550 km/h (=139 m/s), the distance between two TRPs is 200 m or 300 m, and 64 beams are formed for each TRP/RACH/antenna for each TRP.

When the distance between the TRPs is 200 m, the time required between two TRPs is 1.44 s, and the time required between two beams is 22.5 ms (see FIG. 2). When the distance between the TRPs is 300 m, the time required for two TRPs is 2.16 s, and the time required between two beams is 33.75 ms.

In the timescale shown in FIG. 2, switch/change of the TCI state of the PDCCH can be appropriately performed by MAC CE-based TCI state change. Switch/change of the TCI state of the PDSCH can be appropriately performed by DCI-based TCI state change.

Thus, switch of beams corresponding to the PDCCH/CORESET can be controlled using higher layer signaling (for example, RRC) and MAC CE-based TCI state indication/update (TCI state indication/update).

<TCI State Indication for PDCCH>

The network may indicate the TCI state corresponding to the CORESET (or the PDCCH) for the UE by using the MAC CE. The MAC CE may be, for example, the MAC CE for a UE-specific PDCCH (for example, UE specific PDCCH MAC CE) (see FIG. 3).

Figure 3:
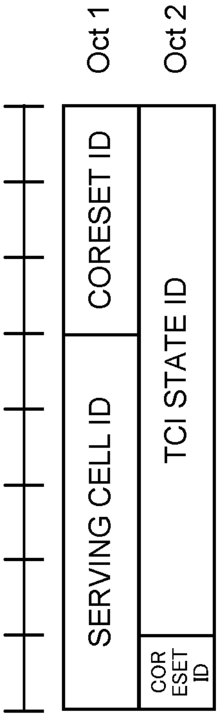
FIG. 3 is a diagram to show an example of a MAC CE used for indication of a TCI state.

FIG. 3 shows an example of the MAC CE used for indication of the TCI state for PDCCH reception for the CORESET of a certain serving cell (or CC list). The UE may determine the TCI state corresponding to the CORESET configured in a certain serving cell, based on MAC indicated from the network.

Incidentally, in order to improve performance of the HST, it is conceivable that a plurality of TRPs/RRHs simultaneously transmit the PDCCH (or the DCI) or simultaneously configure the CORESET for the UE. Each TRP/RRH may use QCLs/beams different from each other.

The UE may determine the TCI state of the PDCCH transmitted from each TRP (or the CORESET configured in each TRP), based on information (for example, the MAC CE) indicated from a plurality (for example, two) of TRPs.

Figure 4:
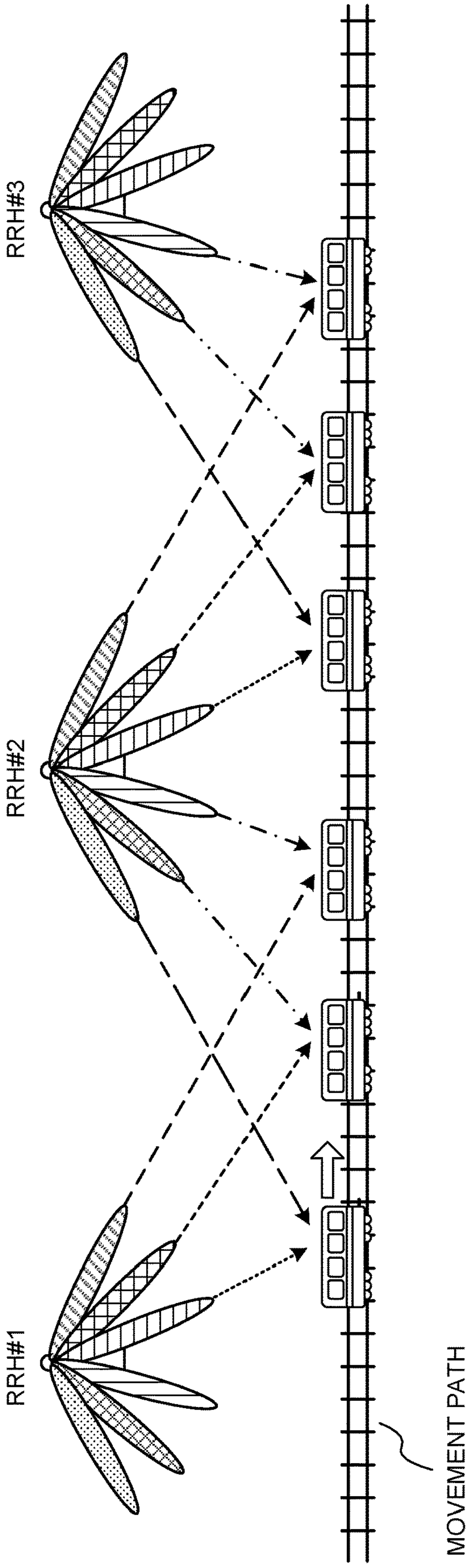
FIG. 4 is a diagram to show another example of communication between the moving object and the transmission points.

When the moving object (or the UE included in the moving object) performs communication with the TRPs/RRHs installed in the movement path, the moving object may receive a DL signal (for example, the PDCCH) by using the beams formed by each TRP/RRH (see FIG. 4). FIG. 4 is a diagram to show an example of radio communication between RRH #1 to RRH #3 installed along the movement path and the moving object.

Figure 5A:
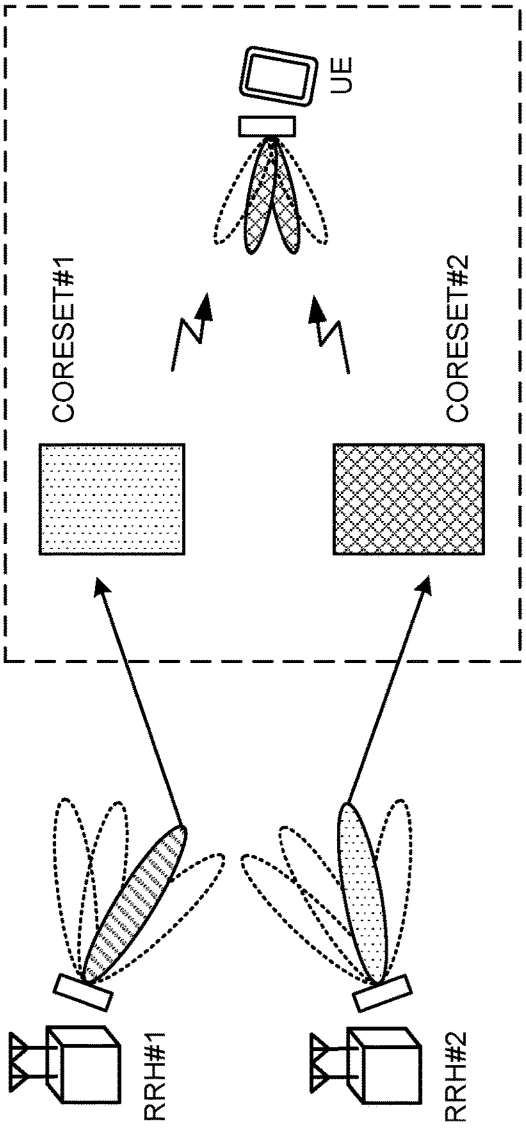
FIG. 5A and FIG. 5B are each a diagram to show an example of transmission and reception of a PDCCH (or DCI) between a terminal and the transmission points.
Figure 5B:
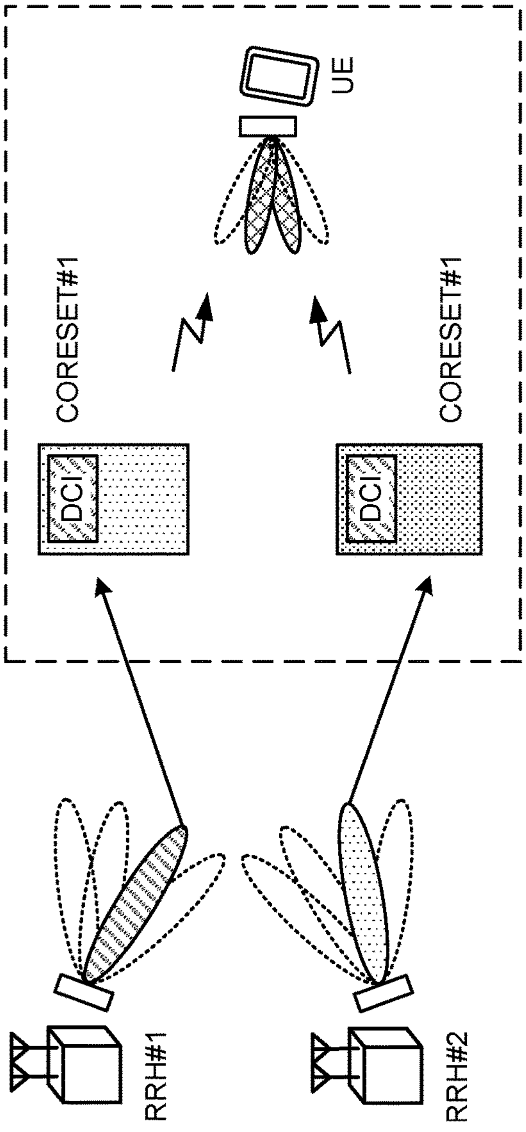

As a method of simultaneously transmitting the PDCCH from a plurality of TRPs/RRHs, the following case 1 and case 2 are conceivable (see FIG. 5A and FIG. 5B).

<Case 1>

Case 1 has a configuration of being supported in Rel. 16, in which multi-DCI based multiple-PDSCH (NCJT TX) transmission is performed. For example, the PDCCH (or the DCI) may be transmitted from different TRPs/RRHs (for example, RRH #1 and RRH #2) by using CORESETs different from each other (see FIG. 5A). The different CORESETs may be associated with different CORESET pool indices (for example, CORESETPoolIndex). In other words, the PDCCH transmitted (or the CORESET configured) from each TRP/RRH is controlled separately from each other.

<Case 2>

Case 2 may have a configuration in which the same DCI/PDCCH is transmitted (or the same CORESET is configured) from a plurality of TRPs/RRHs. For example, the PDCCH (or the DCI) may be transmitted from different TRPs/RRHs (for example, RRH #1 and RRH #2) by using the CORESET the same as each other (see FIG. 5B). With this configuration, reliability can be enhanced. Note that case 2 is a configuration not supported in Rel. 16 yet.

In the HST, applying case 2 is also conceivable from the viewpoint of enhancing reliability of communication. However, in such a case, how to control PDCCH (DCI)/CORESET transmission based on case 2, or how to control QCL assumption poses a problem.

In view of this, the inventors of the present invention studied the PDCCH (or the DCI) transmitted from each of a plurality of TRPs/RRHs, and came up with the idea of the present embodiment. Specifically, the inventors of the present invention studied a case in which the same DCI (for example, DCI in which at least one of a format and indication details is the same) is indicated for the UE from a plurality of TRPs/RRHs, and came up with the idea of the present embodiment.

Embodiments according to the present disclosure will be described in detail below with reference to the drawings. The configuration described in aspects of each of the embodiments may be applied individually, or may be applied in combination. The following description will be given by taking an example of a case of using the moving object. However, the present embodiment is not limited to the case of using the moving object, and may be applied to a case without using the moving object.

A TCI state, a TCI state or a QCL assumption, a TCI state duration, a QCL assumption, a QCL duration, a QCL parameter, a spatial domain reception filter, a UE spatial domain reception filter, a spatial domain filter, a UE receive beam, a DL receive beam, DL precoding, a DL precoder, a DL-RS, a QCL parameter followed by a DMRS port, an RS of the QCL type D of a TCI state or a QCL assumption, and an RS of the QCL type A of a TCI state or a QCL assumption may be interchangeably interpreted as each other. An RS of the QCL type D, a DL-RS associated with the QCL type D, a DL-RS having the QCL type D, a source of the DL-RS, an SSB, and a CSI-RS may be interchangeably interpreted as each other.

In the present disclosure, the TCI state may be information (for example, the DL-RS, the QCL type, a cell in which the DL-RS is transmitted, or the like) related to a receive beam (spatial domain reception filter) indicated (configured)

for the UE. The QCL assumption may be information (for example, the DL-RS, the QCL type, a cell in which the DL-RS is transmitted, or the like) related to a receive beam (spatial domain reception filter) that is assumed by the UE, based on transmission or reception of an associated signal (for example, a PRACH).

In the present disclosure, the moving object may be an object that moves at a certain speed or higher, and may be, for example, a train, an automobile, a motorcycle, a ship, or the like. Communication between the UE included in the moving object and the transmission point (for example, the RRH) may be performed directly between the UE and the transmission point, or may be performed between the UE and the transmission point via the moving object (for example, an antenna installed in the moving object or the like). In the present disclosure, the UE included in the moving object (HST) may be simply referred to as a UE.

In the present disclosure, "X (for example, the TCI state, or the control resource set) is different" may be interpreted as "X is separately (or independently) configured". The TCI state of the PDCCH may be interpreted as the TCI state of the DMRS for the PDCCH.

In the present disclosure, "A/B" may be interpreted as at least one of A and B, and "A/B/C" may be interpreted as at least one of A, B, and C.

(First Aspect)

A first aspect will describe a case in which configuration/activation/indication of a plurality of TCI states is supported for one control resource set. The following description will be given by taking two TCI states as an example of the plurality of TCI states. However, similar application is possible to three or more TCI states as well.

The UE may receive TCI state indication (for example, TCI State Indication) for activating one or a plurality (for example, two) of TCI states for a control resource set. The TCI state indication may be indicated using the MAC CE. The MAC CE may be the MAC CE for a UE-specific PDCCH (UE-specific PDCCH MAC CE).

As the MAC CE used for the TCI state indication, a new MAC CE may be defined separately from the MAC CE (for example, see FIG. 3 described above) of an existing system (for example, Rel. 15). The new MAC CE may have a new LCID (Logical Channel ID).

<Configuration #1 of New MAC CE>

Figure 6A:
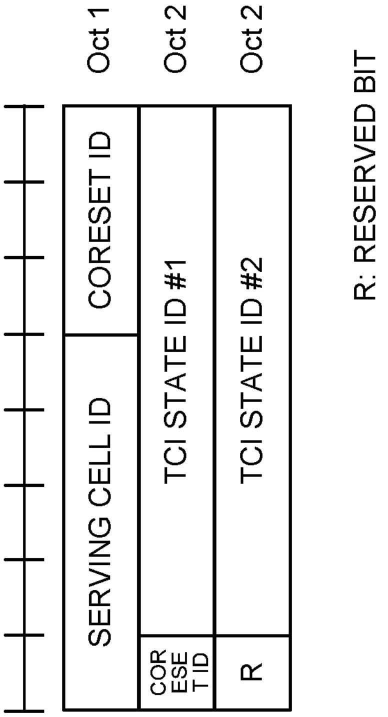
FIG. 6A and FIG. 6B are each a diagram to show an example of a MAC CE according to a first aspect.

In the new MAC CE, a plurality of TCI states (for example, two TCI state indices) may be configured/activated/indicated (see FIG. 6A). FIG. 6A is a diagram to show an example of the new MAC CE. Here, a case in which the new MAC CE includes a bit field for specifying a serving cell (for example, Serving Cell ID), a bit field for specifying a control resource set (for example, CORESET ID), and a bit field for specifying a plurality of TCI states (for example, TCI State ID) is shown.

Here, as the bit field for specifying a plurality of TCI states, a case in which two-bit fields (for example, TCI State ID #1 and TCI State ID #2) are included is shown. However, the number of bit fields is not limited to this.

The UE may detect the new MAC CE for activating two TCI states for the control resource set. The UE may detect an existing MAC CE for activating one TCI state for the control resource set, in addition to the new MAC CE.

When the UE detects/receives the new MAC CE, the UE may assume that at least one of the plurality of TCI states is applied to a control resource set ID specified by the new MAC CE, and control reception of the PDCCH transmitted in the control resource set. For example, when the PDCCH (or the DCI) is transmitted from each of a plurality of TRPs/RRHs by using control resource sets having the same index, the UE may assume that different TCI states are applied to each of the control resource sets corresponding to each TRP.

With this configuration, even when the same PDCCH (or the DCI) is transmitted from each of a plurality of TRPs by using the same control resource set, the TCI state to be applied to the control resource set can be separately configured for each TRP.

<Configuration #2 of New MAC CE>

The MAC CE shown in FIG. 6A shows a case in which a plurality of TCI states are invariably indicated. However, this is not restrictive. In the new MAC CE, one or a plurality (for example, two) of TCI states may be able to be indicated.

Figure 6B:
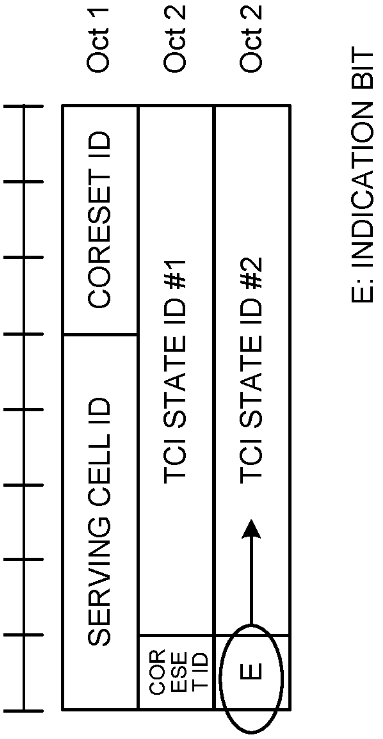

For example, in the MAC CE, a bit field for specifying whether at least one of bit fields indicating two TCI state indices is enabled or disabled may be configured (see FIG. 6B). Here, the following case is shown: bit fields used for indication of a first TCI state (for example, TCI state #1) and of a second TCI state (for example, TCI state #2) are configured, and a bit field for indication indicating whether or not the bit field for the second TCI state is enabled is configured.

For example, when the bit field for indication is "1", two TCI states (here, TCI state #1 and TCI state #2) may be activated by the new MAC CE. In contrast, when the bit field for indication is "0", one TCI state (here, TCI state #1) may be activated by the new MAC CE. In such a case, the UE may ignore the bit field for the second TCI state.

With this configuration, configuration/activation/indication of one or a plurality of TCI states can be performed by using the new MAC CE, and thus the UE may perform control to detect the new MAC CE and not to detect an existing MAC CE.

In this manner, by supporting the configuration of a plurality of TCI states for one control resource set, the PDCCH (or the DCI) can be transmitted by configuring the same control resource set with the TCI states separately configured in different TRPs/RRHs. The UE may perform reception processing, assuming that the PDCCH (or the DCI) is transmitted from a plurality of TRPs by using the same control resource set. With this configuration, reception processing of the UE can be facilitated.

The format/at least a part of indication details of the DCI transmitted from different TRPs/RRHs may be the same. The format of the DCI may be DCI format 1_1 or DCI format 0_1. At least a part of the indication details may be allocation (or scheduling) information of a downlink shared channel or an uplink shared channel.

(Second Aspect)

A second aspect will describe a case in which indication of the TCI state for the control resource set (or the PDCCH) is controlled based on a higher layer parameter (for example, RRC) and the MAC CE.

The network may configure/indicate candidates of one or a plurality of TCI states for the UE by using a higher layer parameter (or higher layer signaling) as the TCI state for the control resource set. The network may indicate/specify a candidate of a specific TCI state to be activated out of the candidates of the TCI states configured using the higher layer parameter for the UE by using the MAC CE.

The higher layer parameter for configuring/indicating the candidates of one or a plurality of TCI states may be a new higher layer parameter that is different from the higher layer parameter used in an existing system (for example, Rel. 15 or Rel. 16), or a higher layer parameter of the existing system may be used. The UE may determine the TCI state to be activated, based on at least one of the following indication method #1 and indication method #2.

<Indication Method #1>

Indication method #1 may be applied to a case in which a new higher layer parameter (for example, a higher layer parameter configured for a PDCCH transmission mode in Rel. 17) is configured. When 1, 2, or X (X>2) TCI states are configured/indicated for the control resource set by the new higher layer parameter, the TCI states to be activated may be determined with separate methods based on the number of TCI states to be configured.

When X (X>2) TCI states are configured by the higher layer parameter, the UE may assume that the UE receives the TCI state indication for activating (or indicating activation of) one or two TCI states for the control resource. The TCI state indication may be indicated by the MAC CE (for example, the UE-specific PDCCH MAC CE). At least one of configuration #1 of the new MAC CE and configuration #2 of the new MAC CE shown in the first aspect may be applied to the MAC CE.

When two TCI states are configured by the higher layer parameter, at least one of the following option 1-1 and option 1-2 may be applied.

[Option 1-1]

The UE may assume that the UE invariably receives the TCI state indication for activating (or indicating activation of) one or two TCI states for the control resource. The TCI state indication may be indicated by the MAC CE (for example, the UE-specific PDCCH MAC CE). At least one of configuration #1 of the new MAC CE and configuration #2 of the new MAC CE shown in the first aspect may be applied to the MAC CE.

[Option 1-2]

When the UE is configured with the new higher layer parameter and does not receive the MAC CE for indicating the TCI state for the control resource set, the UE may assume two TCI states for the control resource set. The MAC CE may be the MAC CE of the existing system or the new MAC CE. In other words, when the UE does not receive the MAC CE for indicating the TCI state, the UE may assume that two TCI states configured/indicated by the higher layer parameter are applied to the control resource set.

When the UE receives the MAC CE for specifying activation of one or two TCI states for the control resource set, the UE may assume that the TCI states indicated by the MAC CE are applied to the control resource set.

Note that, in option 2, when the new higher layer parameter is configured, and two (or two or less) TCI states are configured/indicated by the higher layer parameter, the UE may assume that the UE does not receive the MAC CE for indicating the TCI states for the control resource set.

When one TCI state is configured by the higher layer parameter, the UE may assume that the TCI state configured/indicated by the higher layer parameter is applied to the control resource set.

When the new higher layer parameter is not configured, the UE may apply operation defined in the existing system.

<Indication Method #2>

Indication method #1 may be applied to a case in which a new higher layer parameter (for example, a higher layer parameter configured for a PDCCH transmission mode in Rel. 17) is not configured or defined. When 1, 2, or X (X>2) TCI states are configured/indicated for the control resource set by the higher layer parameter, the TCI states to be activated may be determined with separate methods based on the number of TCI states to be configured.

When X (X>2) TCI states are configured by the higher layer parameter, the UE may assume that the UE receives the TCI state indication for activating (or indicating activation of) one or two TCI states for the control resource. The TCI state indication may be indicated by the MAC CE (for example, the UE-specific PDCCH MAC CE). At least one of configuration #1 of the new MAC CE and configuration #2 of the new MAC CE shown in the first aspect may be applied to the MAC CE.

When two TCI states are configured by the higher layer parameter, at least one of the following option 2-1 and option 2-2 may be applied.

[Option 2-1]

The UE may assume that the UE invariably receives the TCI state indication for activating (or indicating activation of) one or two TCI states for the control resource. The TCI state indication may be indicated by the MAC CE (for example, the UE-specific PDCCH MAC CE). At least one of configuration #1 of the new MAC CE and configuration #2 of the new MAC CE shown in the first aspect may be applied to the MAC CE.

[Option 2-2]

When at least one control resource set (for example, another control resource set) having X (X>2) TCI states by the higher layer parameter is activated in two TCI states by the MAC CE, and the UE does not receive the MAC CE for indicating the TCI states for the control resource set, the UE may assume two TCI states for the control resource set. The MAC CE may be the MAC CE of the existing system or the new MAC CE. In other words, when the UE is configured with two TCI states by the higher layer parameter and does not receive the MAC CE for indicating the TCI states when two TCI states are activated by the MAC CE when more than two TCI states are configured, the UE may assume that the two TCI states configured/indicated by the higher layer parameter are applied to the control resource set.

When the UE receives the MAC CE for specifying activation of one or two TCI states for the control resource set, the UE may assume that the TCI states indicated by the MAC CE are applied to the control resource set.

Note that, in option 2, when two (or two or less) TCI states are configured/indicated by the higher layer parameter when two TCI states are activated by the MAC CE when more than two TCI states are configured, the UE may assume that the UE does not receive the MAC CE for indicating the TCI states for the control resource set.

When one TCI state is configured by the higher layer parameter, the UE may assume that the TCI state configured/indicated by the higher layer parameter is applied to the control resource set.

(Third Aspect)

A third aspect will describe PDCCH resources or a configured control resource set when the DCI having the same format/indication details is transmitted to the UE from a plurality of TRPs.

When the DCI is transmitted to the UE from a plurality of TRPs, at least one of the following option 3-1 to option 3-4 may be applied to the PDCCH or the configured control resource set used for transmission of the DCI. The DCI transmitted from a plurality of TRPs may be the same DCI. The same DCI may be DCI having the same format/indication details. The indication details may be at least a part of indication details (for example, scheduling information of a shared channel).

<Option 3-1>

When configuration/activation/indication of a plurality of TCI states is supported for one control resource set, the UE may assume that the UE detects one piece of DCI (for example, DCI format) in the control resource set having two TCI states in the same symbol. The DCI format may be any one of DCI format 1_1 for scheduling the PUSCH, DCI format 0_1 for scheduling the PUSCH, and given DCI format X.

Figure 7A:
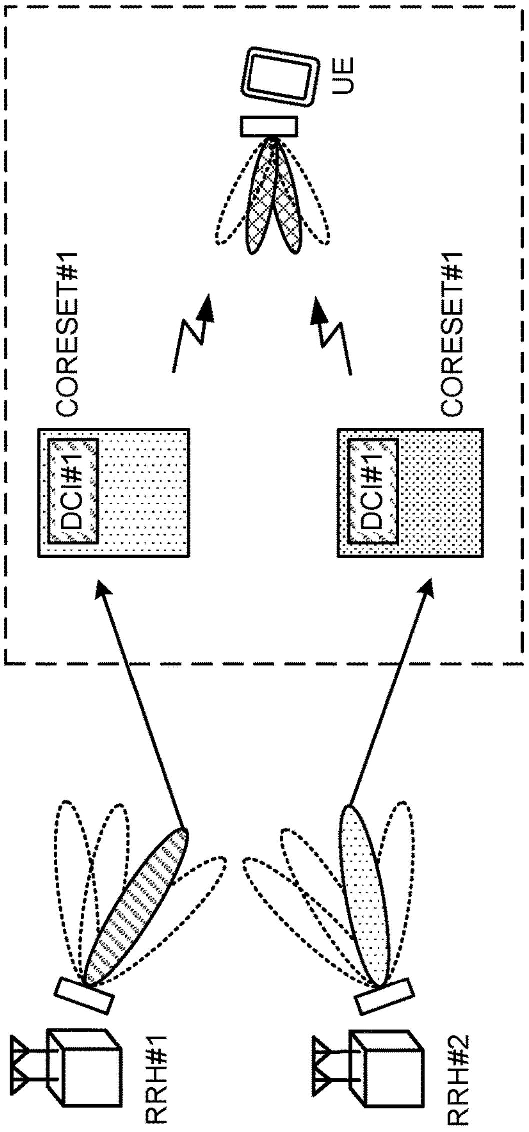
FIG. 7A and FIG. 7B are each a diagram to show an example of communication control between the terminal and the transmission point according to a third aspect.

The DCI transmitted from each of a plurality of TRPs (for example, two TRPs) may be transmitted in the same resource (for example, a resource having the same time and frequency) (see FIG. 7A). FIG. 7A shows a case in which the DCI is transmitted using the resource having the same time and frequency.

Each TRP may configure a control resource set having the same index, and allocate the PDCCH (or the DCI) to the same resource in the configured control resource set to perform transmission to the UE. In this case, in the control resource set configured by each TRP (or the PDCCH (or the DCI) transmitted from each TRP), only the TCI state (or QCL/beam) may be separately configured (for example, the TCI state is different). The DCI transmitted from each TRP may have the same format/indication details.

In this manner, in option 3-1, from a plurality of TRPs, transmission of the DCI having the same format/indication details is performed by using one control resource set having a plurality of TCI states and being configured in the same resource. With this configuration, detection operation in the UE can be facilitated. Further, by using the same resource, use efficiency of the resources can be enhanced.

<Option 3-2>

When configuration/activation/indication of a plurality of TCI states is supported for one control resource set, the UE may assume that the UE detects up to two pieces of DCI (for example, DCI formats) in the control resource set having two TCI states in the same symbol. The DCI format may be any one of DCI format 1_1 for scheduling the PUSCH, DCI format 0_1 for scheduling the PUSCH, and given DCI format X.

Figure 7B:
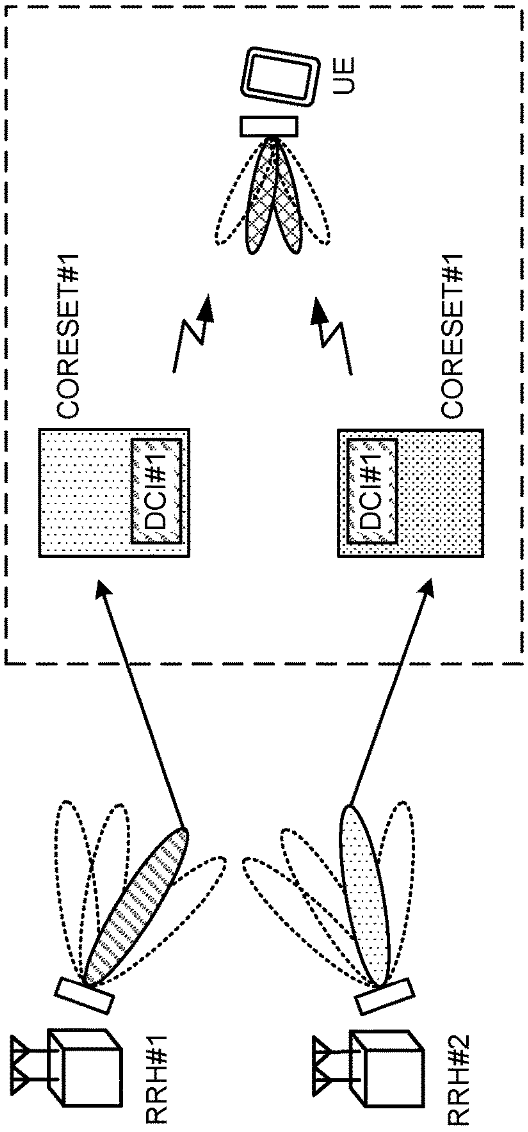

The DCI transmitted from each of a plurality of TRPs (for example, two TRPs) may be transmitted in different resources (for example, resources having different frequencies) (see FIG. 7B). FIG. 7B shows a case in which the DCI is transmitted using resources having different frequencies (time is the same).

Each TRP may configure a control resource set having the same index, and allocate the PDCCH (or the DCI) to different resources in the configured control resource set to perform transmission to the UE. In this case, in the control resource set configured by each TRP (or the PDCCH (or the DCI) transmitted from each TRP), the TCI state (or QCL/beam) may be separately configured (for example, the TCI state is different). The DCI transmitted from each TRP may have the same format/indication details.

In this manner, in option 3-2, from a plurality of TRPs, transmission of the DCI having the same format/indication details is performed by using one control resource set having a plurality of TCI states and being configured in different resources (for example, different frequency resources). With this configuration, received power of the PDCCH transmitted in different resources can be enhanced.

<Option 3-3>

When configuration/activation/indication of a plurality of TCI states is supported for one control resource set, the UE may simultaneously detect two pieces of DCI (for example, DCI formats) from different control resource sets having different TCI states. The DCI transmitted from each TRP may have the same format/indication details.

In other words, in option 3-3, from a plurality of TRPs, transmission of the DCI having the same format/indication details may be performed by using different control resource sets having different TCI states and being respectively configured for different resources (for example, different frequency resources).

Each control resource set may correspond to only one TCI state. The UE may simultaneously detect the DCI from two control resource sets having different TCI states. When a new transmission mode (for example, configuration/activation/indication of a plurality of TCI states for one control resource set) is supported, the UE may assume that the same DCI is transmitted from different control resource sets having different TCI states.

In option 3-3, the same DCI can be transmitted by applying a framework of the control resource set in the existing system (for example, Rel. 15) and using different control resource sets respectively configured for each TRP.

<Option 3-4>

When configuration/activation/indication of a plurality of TCI states is supported for one control resource set, the UE may simultaneously detect two pieces of DCI (for example, DCI formats) from a plurality of control resource sets selected from different control resource set pool indices (CORESET pool index). The DCI transmitted from each TRP may have the same format/indication details.

In other words, in option 3-3, from a plurality of TRPs, transmission of the DCI having the same format/indication details may be performed by using different control resource sets having different control resource set pool indices and being respectively configured for different resources (for example, different frequency resources).

Each control resource set may correspond to only one TCI state. The UE may simultaneously detect the DCI from different control resource set pools. When a new transmission mode (for example, configuration/activation/indication of a plurality of TCI states for one control resource set) is supported, the UE may assume that the same DCI is transmitted from the control resource sets respectively selected from different control resource set pool indices.

In option 3-4, the same DCI can be transmitted by applying a framework of the control resource set pool index in the existing system (for example, Rel. 16) and using the control resource sets respectively selected from different control resource set pool indices.

<Variations>

Resource blocks (for example, PRBs) to which a plurality of PDCCHs (for example, two PDCCHs) transmitted from a plurality of TRPs (for example, two TRPs) are allocated may be overlapped, or may not be overlapped.

When the PRBs of two PDCCHs are overlapped (for example, option 3-1), the two PDCCHs are in the same resource (time and frequency resource), and thus the same number of times as one TRP may be applied to the number of times of decoding (for example, blind detection) performed by the UE.

When the PRBs of two PDCCHs are not overlapped (for example, option 3-2 to option 3-4), the two PDCCHs are in different resources, and thus a different number of times from one TRP (for example, the number of times larger than one TRP) may be applied to the number of times of decoding (for example, blind detection) performed by the UE.

For example, the UE may independently configure a search space for each TRP, and perform blind detection for each TRP. In this case, by restricting at least one of a search space for each TRP, a monitoring resource, and an aggregation level, increase of brand detection may be prevented.

For example, by adding a given offset to the time/frequency resources of the search space measured by the first TRP, the time/frequency resources of the search space measured by the second TRP may be determined. With this configuration, blind detection is not independently performed for the control resource set of each TRP, and thus the number of times of blind detection can be reduced.

The UE may assume that the PRBs of the PDCCHs transmitted from each of a plurality of TRPs are not overlapped, and perform control to detect the DCI transmitted on each PDCCH. If the PRBs of the PDCCHs transmitted from each of a plurality of TRPs are overlapped, control may be performed to detect only the DCI (for example, DCI related to a specific TRP) transmitted on any one of the PDCCHs. The specific TRP may be a TRP having the lowest index (lowest TRP ID), or a TRP having the highest index (highest TRP ID).

(UE Capability)

UE capability indicating whether or not the control resource set in which a plurality of TCI states are simultaneously activated/indicated is supported may be introduced.

For example, the UE may simultaneously assume a plurality (for example, two) of TCI states, and indicate information related to whether or not reception of the DCI can be supported as the UE capability information. Alternatively, the UE may indicate information related to whether or not a DCI format that can be assumed to be simultaneously received in a plurality (for example, two) of TCI states can be supported as the UE capability information.

Alternatively, the UE may indicate information related to the number of control resource sets simultaneously activated/indicated in a plurality (for example, two) of TCI states as the UE capability information.

(QCL Transition Information)

In the first aspect to the third aspect, the UE included in the HST may determine the TCI state/QCL assumption/QCL duration used for transmission and reception to and from an NW, based on information related to beam transition.

The information related to beam transition may be interpreted as information related to transition of the SSB, information related to transition of the CSI-RS, and information related to transition of the SSB/CSI-RS. In the present disclosure, “transition” may be interchangeably interpreted as “change”, “update”, “switch”, “enable”, “disable”, “activate”, “deactivate”, “activate/deactivate”, and the like.

The UE may control reception of DL transmission transmitted from the transmission point, based on the information related to beam transition. The beam transition may be interchangeably interpreted as TCI state transition or QCL transition. The information related to beam transition may be indicated from the network (for example, the base station, or the transmission point) to the UE by using at least one of the RRC signaling and the MAC CE, or may be defined in a specification in advance.

The information related to beam transition may include at least one of information related to transition of the TCI state, duration corresponding to each beam (also referred to as beam duration or beam time), and duration corresponding to the RRH (also referred to as RRH duration or RRH time). Note that the duration or time may be defined in the unit of at least one of a symbol, a slot, a subslot, a subframe, and a frame, or may be defined in the unit of ms or μs. The duration or time may be interpreted as a distance or an angle.

The information related to transition of the TCI state (for example, TCI #n→TCI #n+1) may be Transition/ordering/index of the TCI state. The duration corresponding to the beam may be duration/dwell-time of the beam. The duration corresponding to the transmission point (RRH) may be duration/dwell-time of the RRH.

The duration corresponding to the RRH may correspond to a total value of the duration corresponding to each beam in the RRH. For example, the UE may acquire the duration corresponding to the RRH from the duration corresponding to each beam. In this case, the duration corresponding to the RRH need no longer be indicated for the UE or defined in advance.

The TCI state and each beam duration may be associated with each other. One or a plurality (for example, two) of TCI states may be associated with each beam duration. Note that the one or plurality of TCI states may correspond to the control resource set (or the DMRS for the PDCCH/PDCCH).

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 8:
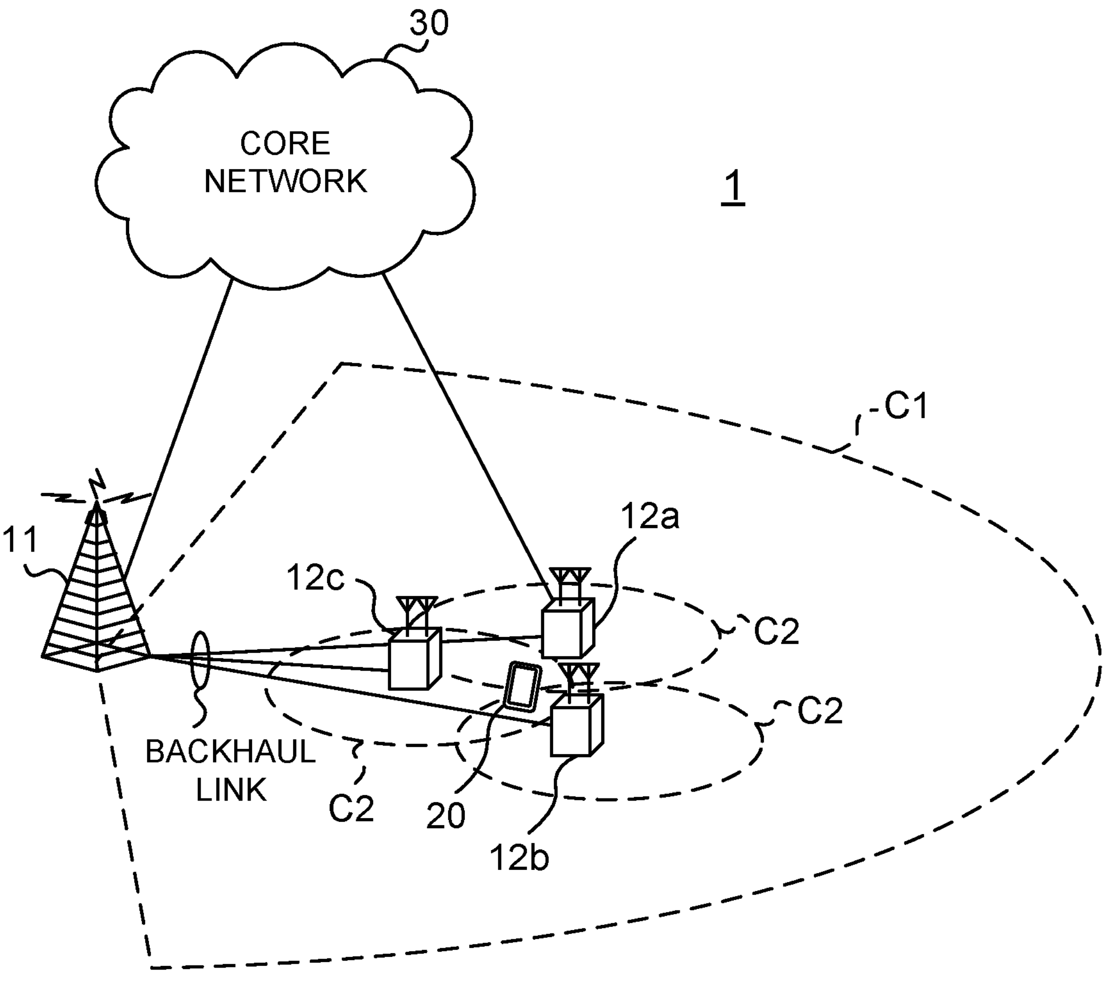
FIG. 8 is a diagram to show an example of a schematic structure of a radio communication system according to one embodiment.

FIG. 8 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell Cl of a relatively wide coverage, and base stations 12 (12*a* to 12*c*) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as “base stations 10,” unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations (for example, RRHs) 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 9:
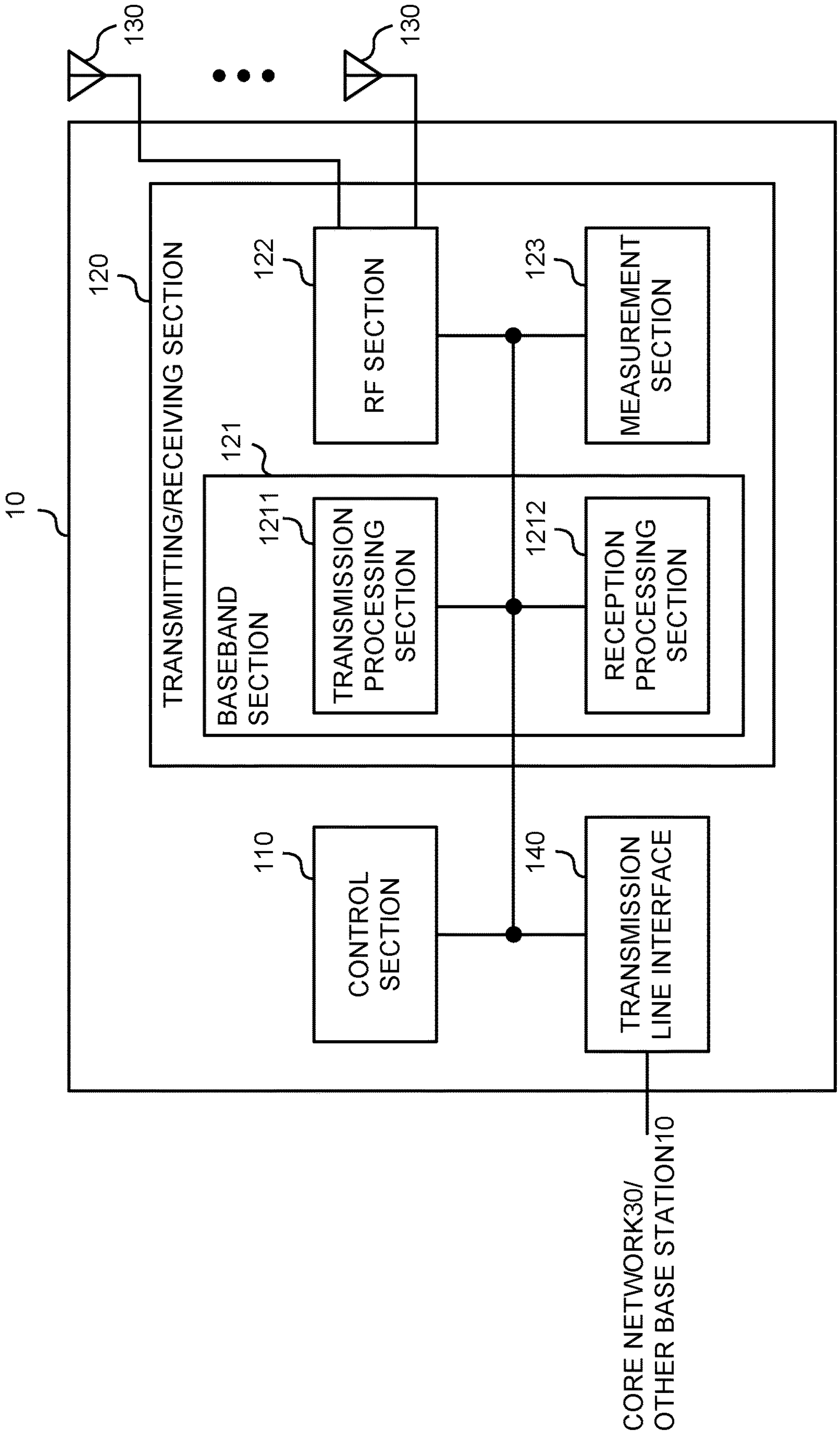
FIG. 9 is a diagram to show an example of a structure of a base station according to one embodiment.

FIG. 9 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The transmitting/receiving section 120 may transmit a MAC CE capable of specifying a plurality of transmission configuration indication (TCI) states for one control resource set.

The transmitting/receiving section 120 may transmit a plurality of pieces of downlink control information from a plurality of transmission points by using control resource sets.

The control section 110 may control transmission of downlink control information by using the control resource set to which at least one of the plurality of TCI states indicated using the MAC CE is applied.

The control section 110 may control allocation of a downlink shared channel or an uplink shared channel by using the plurality of pieces of downlink control information.

(User Terminal)

Figure 10:
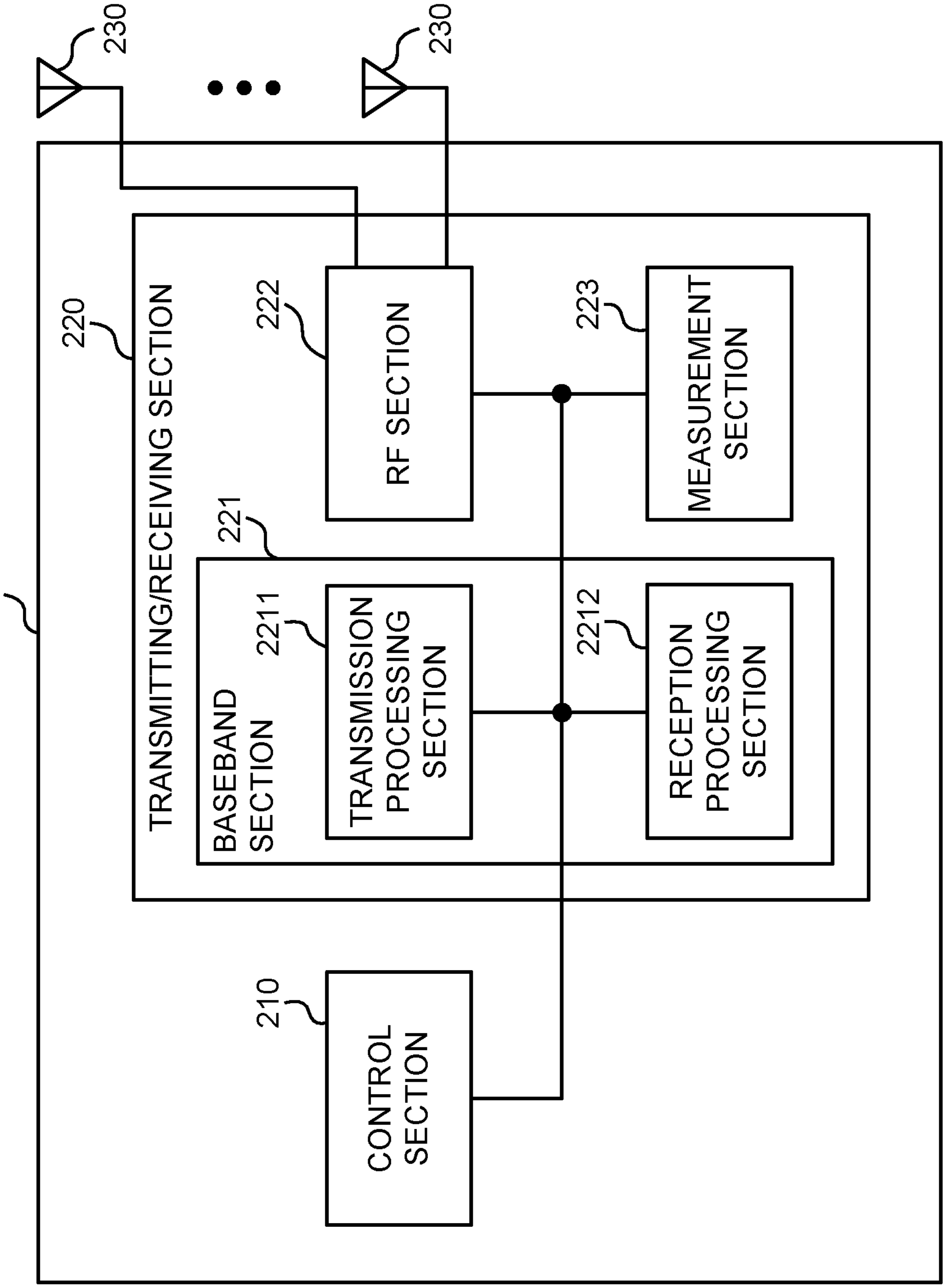
FIG. 10 is a diagram to show an example of a structure of a user terminal according to one embodiment.

FIG. 10 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive a MAC CE capable of specifying a plurality of transmission configuration indication (TCI) states for one control resource set.

The transmitting/receiving section 220 may receive a plurality of pieces of downlink control information transmitted from a plurality of transmission points by using control resource sets.

The control section 210 may control reception of downlink control information transmitted from each of a plurality of transmission points by using a same control resource set (for example, control resource set having a same index), based on the MAC CE.

The MAC CE may include a first bit field indicating an index of a control resource set, and a plurality of second bit fields indicating the plurality of TCI states corresponding to the control resource sets. The MAC CE may include a third bit field for specifying whether at least one of the plurality of second bit fields is enabled or disabled. When the plurality of TCI states are configured by higher layer signaling, the control section 210 may perform control to activate one or two TCI states specified by the MAC CE.

Alternatively, the control section 210 may determine allocation of a downlink shared channel or an uplink shared channel, based on the plurality of pieces of downlink control information. In the plurality of pieces of downlink control information transmitted from the plurality of transmission points, at least one of a format and indicated details of scheduling may be the same.

The control resource sets configured for the plurality of transmission points may have a same index and correspond to a plurality of TCI states, and the downlink control information transmitted from each of the plurality of transmission points may be transmitted using a downlink control channel allocated to a same resource. Alternatively, the control resource sets configured for the plurality of transmission points may have a same index and correspond to a plurality of TCI states, and the downlink control information transmitted from each of the plurality of transmission points may be transmitted using a downlink control channel allocated to different resources. Alternatively, the control resource sets configured for the plurality of transmission points may have different indices, and the downlink control information transmitted from each of the plurality of transmission points may be transmitted using a downlink control channel allocated to different sources.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 11:
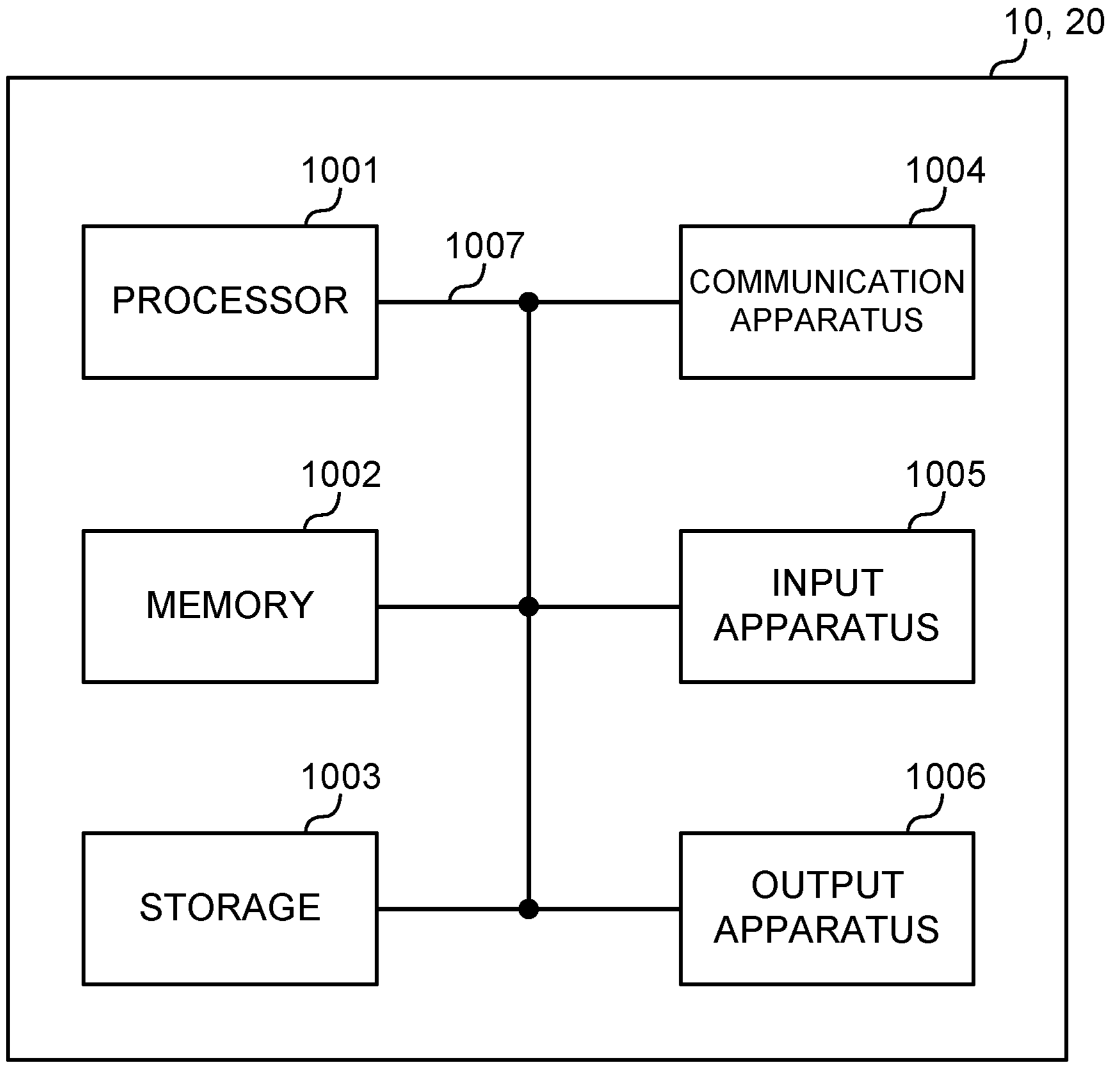
FIG. 11 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 11 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG),"a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for given numerology in a given carrier. Here, a common RB may be specified by an index of the RB based on the common reference point of the carrier. A PRB may be defined by a given BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names assigned to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:

a receiver that receives a MAC control element (MAC CE) indicating multiple transmission configuration indication (TCI) states for one control resource set (CORESET), wherein each TCI state of the multiple TCI states is associated with a CORESET ID field that is included in the MAC CE and indicates the one CORESET; and a processor that controls reception of a first physical downlink control channel (PDCCH) and a second PDCCH, each carrying a same downlink control information (DCI), using the multiple TCI states in a search space of the one CORESET, wherein the first PDCCH is from a first transmission reception point (TRP) and the second PDCCH is from a second TRP.

2. The terminal according to claim 1, wherein the MAC CE includes a bit field indicating a serving cell, and a bit field indicating the multiple TCI states.

3. The terminal according to claim 1, wherein the MAC CE has a logical channel ID (LCID) different from an LCID of a second MAC CE indicating one TCI state for one CORESET.

4. The terminal according to claim 1, wherein the receiver receives the MAC CE when a higher layer parameter for configuring multiple TCI states for a CORESET is configured.

5. The terminal according to claim 1, further comprising a transmitter that transmits capability information indicating support of a CORESET for which multiple TCI states are indicated.

6. A radio communication method performed by a terminal, comprising:

receiving a MAC control element (MAC CE) indicating multiple transmission configuration indication (TCI) states for one control resource set (CORESET), wherein each TCI state of the multiple TCI states is associated with a CORESET ID field that is included in the MAC CE and indicates the one CORESET; and controlling reception of a first physical downlink control channel (PDCCH) and a second PDCCH, each carrying a same downlink control information (DCI), using the multiple TCI states in a search space of the one CORESET, wherein the first PDCCH is from a first transmission reception point (TRP) and the second PDCCH is from a second TRP.

7. A system comprising a terminal and a base station, wherein the terminal comprises:

a receiver that receives a MAC control element (MAC CE) indicating multiple transmission configuration indication (TCI) states for one control resource set (CORESET), wherein each TCI state of the multiple TCI states is associated with a CORESET ID field that is included in the MAC CE and indicates the one CORESET; and a processor that controls reception of a first physical downlink control channel (PDCCH) and a second PDCCH, each carrying a same downlink control information (DCI), using the multiple TCI states in a search space of the one CORESET, wherein the first PDCCH is from a first transmission reception point (TRP) and the second PDCCH is from a second TRP, and the base station comprises:

a transmitter that transmits the MAC CE.

* * * * *